United States Patent [19]
Bourdon

[11] 3,849,009
[45] Nov. 19, 1974

[54] BALL AND SOCKET JOINT FOR RACK AND PINION STEERING GEAR

[75] Inventor: Julien Louis Bourdon, Suresnes, France

[73] Assignee: Gemmer France, Suresnes, France

[22] Filed: Mar. 9, 1973

[21] Appl. No.: 339,567

[30] Foreign Application Priority Data
Mar. 28, 1972 France.............................. 72.10831

[52] U.S. Cl. .............................................. 403/133
[51] Int. Cl. ...... B25q 3/38, F16b 7/00, F16c 11/06
[58] Field of Search ............ 403/133, 135, 140, 132

[56] References Cited
UNITED STATES PATENTS
2,424,455   7/1947   Graham et al....................... 403/132
3,355,787   12/1967   Sullivan ......................... 403/140 X

*Primary Examiner*—Geo. V. Larkin
*Attorney, Agent, or Firm*—Hill, Gross, Simpson, Van Santen, Steadman, Chiara & Simpson

[57] ABSTRACT

A ball and socket joint with a plastic ball receiving bearing housed in a metal tube is attached to the end of the rack bar of a rack and pinion steering gear by crimping the housing over a plug in such a manner as to preload the bearing and attaching either the plug or a portion of the tube beyond the plug to the end of the rack bar. The plug or housing is preferably threaded into or onto the rack bar end. A washer is attached to either the plug or housing in non-rotatable relation to provide a wrench engaging head for the assembly to facilitate threading of the joint assembly onto the rack bar end.

15 Claims, 5 Drawing Figures

PATENTED NOV 19 1974         3,849,009

BALL AND SOCKET JOINT FOR RACK AND PINION STEERING GEAR

FIELD OF THE INVENTION

This invention relates to the art of pre-loaded ball and socket joints and attaching them to the ends of rods such as the rack bar of a rack and pinion steering gear. Particularly, the invention deals with ball and socket joints having plastic ball socket bearings pre-loaded in inexpensive metal tubular housings attached to the ends of the rack bar of a rack and pinion steering assembly.

DESCRIPTION OF THE PRIOR ART

Heretofore ball and socket joints for the steering gear of automotive vehicles had to be made with forged or cast parts requiring expensive and precise machining operations to produce the geometry needed for tilting and rotating of the joint components. The assembly of the components was complicated and expensive.

SUMMARY OF THE INVENTION

The present invention avoids the expense and inconveniences of the prior art by providing ball and socket joints having constituent components assembled in such a manner as to avoid machining operations, losses of material and forged parts. The joints of this invention have the component parts assembled in a desired pre-loaded condition by a simple and rapid crimping operation. The pre-loaded joints have ample wear take up capacity, controlled operating torque and are free from springs or the like accommodating displacement of the ball from a fixed tilting and rotating center.

The ball and socket joints of this invention have a metal ball stud with a ball end enveloped by a plastic bearing block which in turn is enveloped by a metal tube and a metal plug in the tube. The tube has an inturned end defining an aperture freely receiving the stud shank therethrough and also providing a should bottoming the plastic bearing. The plug or closure cap has a sliding fit in the housing and is recessed to receive a complementary shaped end on the bearing. The housing is crimped over the plug pressing it toward the shoulder and thereby pre-loading the bearing around the ball.

In a first embodiment, the plug has a stem projecting therefrom beyond the housing receiving a washer in non-rotatable relation and having a threaded end portion for threading into a tapped recess in the end of a rod such as the rack bar of a rack and pinion steering assembly. The washer has flat sides providing gripping edges for a wrench so that the assembly may be rotated to thread the stem into its recess.

In a second embodiment, the tubular housing extends beyond the plug and is crimped to the smaller diameter of the rod on which it is to be threaded. The crimping is preferably accomplished by a multi-jaw press or vise which not only reduces the diameter of the tube to the rack bar diameter but also raises external longitudinal folds adapted to be spread so that the crimped housing portion will be somewhat resilient and have a gripping action on the threads of the rack bar.

It is then an object of this invention to provide joint assemblies with inexpensive housings crimped onto rod members or the like and pre-loading the joint components.

Another object of the invention is to provide ball and socket joints for automotive steering linkages which are free from machined and forged housing parts.

Another object of the invention is to provide pre-loaded ball and socket joints on the ends of the rack bar of an automobile rack and pinion steering gear where the pre-loading and assembly of the joint components is accomplished by an inexpensive crimping operation on the housing.

Another object of the invention is to provide a ball and socket joint where the ball end of the stud is enveloped in a plastic bearing block which in turn is enveloped by a metal tube and a closure plug in the tube and the tube is crimped over the plug to pre-load the bearing and to provide an attachment for connecting the joint assembly to the end of a rod.

Another object of the invention is to provide an inexpensive rapid method of assembling ball and socket joint components by a crimping operation.

Other and further objects of this invention will become apparent to those skilled in this art from the following detailed description of the annexed sheet of drawings which by way of preferred examples illustrate several embodiments of the invention.

AS SHOWN ON THE DRAWINGS

DESCRIPTION OF THE ILLUSTRATED EMBODIMENTS

Figure 1:
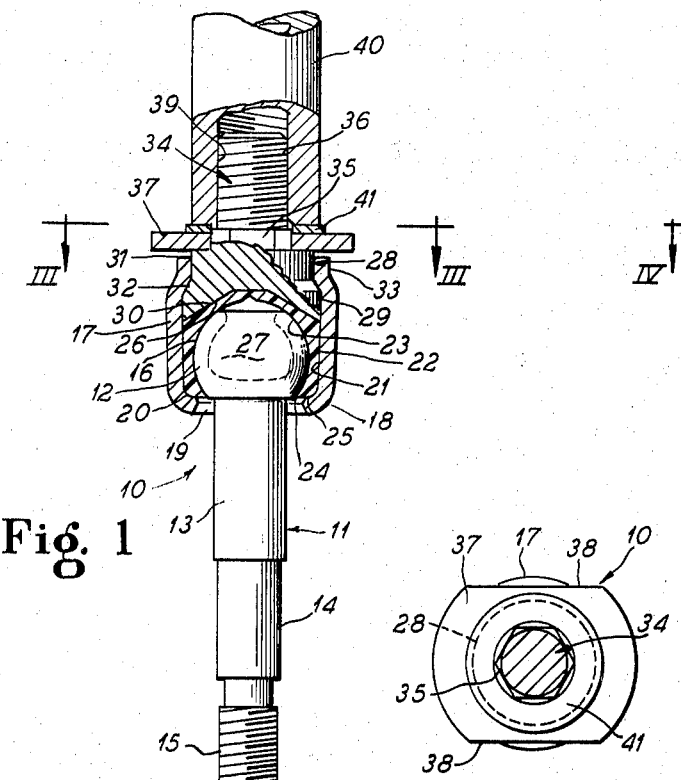
FIG. 1 is a longitudinal sectional view with parts in elevation of one embodiment of the ball and socket joint assembly of this invention.
Figure 3:
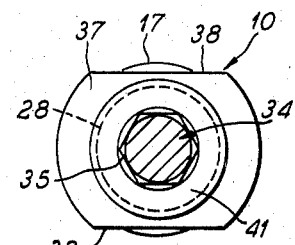
FIG. 3 is a transverse sectional view along the line III—III of FIG. 1.

In FIGS. 1 and 3, the reference numeral 10 illustrates generally a first embodiment of a ball and socket joint assembly of this invention attached to the end of a rack bar or the like rod. The assembly 10 includes a metal stud 11 with a hollow substantially full ball end 12, a cylindrical shank portion 13 extending from the ball end 12, and a reduced diameter shank portion 14 extending from the portion 13 to a threaded end 15.

The ball end 12 is encased in a plastics bearing block 16 preferably composed of a high density polyethylene plastics material sold in the trade for example, under the name of "Manolene" or an acetal resin sold in the trade under the name of "Delrin."

A metal tube 17 surrounds the bearing 16 in snug embracing relation and has a inturned end 18 providing an aperture 19 through which the stud shank 13 freely extends. The inturned end 18 also provides an internal shoulder 20 bottoming the plastics bearing 16.

The plastics bearing 16 has a cylindrical external wall 21 fitting tightly in the internal cylindrical wall 22 of the tubular housing 17 and a spherical inner wall 23 snugly receiving the ball end 12 and with an aperture 24 in the housing aperture 19 and freely receiving the stud shank 14 13 that the ball end 12 may tilt in the plastics bearing. The aperture 24 is surrounded by an end face or rim 25 bottomed on the shoulder 20. The plastics bearing 16 has a closed bottom 26 of frusto-conical shape overlying the hollow interior 27 of the ball end 12. Lubricating material can fill this hollow interior 27 and will be sealed in the plastics bearing 16 to lubricate the bearing wall 23 thereof.

A metal closure plug or cap 28 has a major diameter portion 29 snugly fitting the wall 22 of the tube 17 and a recess 30 in its end face snugly receiving the fructo-conical bottom end 26 of the plastics bearing. A reduced diameter portion 31 of the plug extends beyond the tubular housing 17. A peripheral shoulder 32 is formed between the plug portions 29 and 31. The end of the housing 17 is crimped at 33 over this shoulder 32 and the crimping operation assists in thrusting the cap 28 toward the inturned end 18 of the housing so that the plastics bearing 16 will be pre-loaded in the housing around the ball end 12.

The cap or plug 28 has a stem 34 projecting centrally therefrom beyond the crimped portion 33 of the housing and provided with a polygonal, preferably hexagonal, base 35. An externally threaded reduced portion 36 projects beyond the base 35. The base 35 is surrounded by a metal washer 37 with a central aperture snugly received on the sides of the base in nonrotatable relation. The washer, as shown in FIG. 3 has flat sides 38 adapted to be gripped by a wrench or the like (not shown) to rotate the joint assembly for threading the stem portion 36 into a tapped recess 39 in the end of a rod such as the rack bar 40 of a rack and pinion automotive steering gear.

A spacer shim or washer 41 may be provided between the end of the rod 40 and the washer 37. A lock washer may be used.

Thus, the embodiment 10 of this invention has a metal tube housing which is crimped to lock a plug or closure cap therein and to simultaneously pre-load the plastics bearing around the ball end of the stud which has its shank projecting freely through an aperture in an inturned end of the housing tube. The closure cap or plug has a stem carrying a washer providing a wrench head and externally threaded for threading into the threaded recess in the end of a rod. The projecting stem of the ball stud 11 has its portion 14 seated in a receiving boss of a steering linkage (not shown) and the threaded end 15 of the stem receives a nut (not shown) forcing the boss into locked engagement with the portion 14.

Figure 2:
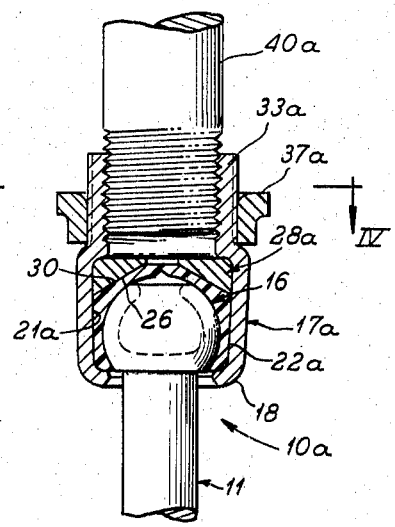
FIG. 2 is a view similar to FIG. 1 but illustrating a second embodiment of the invention.
Figure 4:
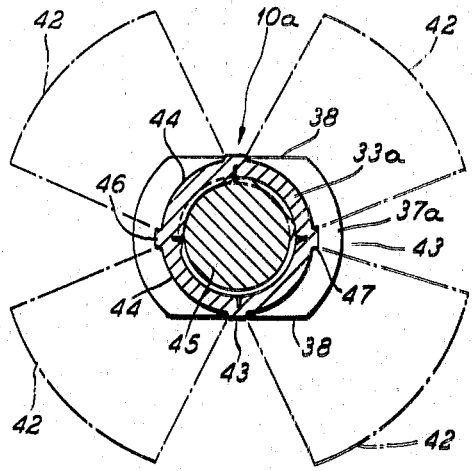
FIG. 4 is a transverse sectional view along the line IV—IV of FIG. 2 and diagrammatically illustrating jaws of a jaw press for the crimping operation.

In the embodiment 10a of FIGS. 2 and 4, parts corresponding with parts described in FIGS. 1 and 3 have been marked with the same reference numerals. In this embodiment 10a, the tubular housing 17a is tapered to provide an internal wall 22a converging toward the inturned end 18 and receiving the tapered wall 21a of the plastics bearing 16. The closure plug or cap 28a does not have the projecting stem 34 of the cap 28 but like the cap 28 has the recess 30 snugly receiving the frusto-conical end 26 of the plastics bearing 16.

The housing 17a is longer than the housing 17 and projects over an externally threaded rod 40a beyond the cap 28a. This portion of the housing is crimped along its length 33a and like the crimped portion 33, provides a shoulder overlying the plug to lock it in the housing. A washer 37a surrounds the crimped portion 33a and in addition to providing the wrench head, it also provides a stop abutment for associated parts (not shown).

The extended crimped portion 33a of the housing 17a is internally threaded and the rod 40a is externally threaded to receive this housing portion.

As shown in FIG. 4, the crimped portion 33a of the housing is formed by four jaws 42 of a jaw press or vise. These jaws are in circumferentially spaced relation with gaps 43 therebetween and have concave faces 44 embracing spaced adjacent circumferential segments of the housing. The jaws are force radially inward to reduce the housing to the diameter of an inserted mandrel 45 and in so collapsing the housing to this diameter external longitudinal folds 46 are raised between the jaws 42. These folds provide resiliency for the housing portion 33a. The resilient portion is internally threaded as explained above and when it is screwed onto an oversized rod 40a the portion 33a will be expanded and have a tight gripping relationship with the rod preventing unauthorized rotation.

The washer 37a has grooves 47 receiving the folds 46 in tight gripping relation so that the washer will not be rotated relative to the housing. The washer, of course, has the flat sides 38 to be engaged by a wrench.

Figure 5:
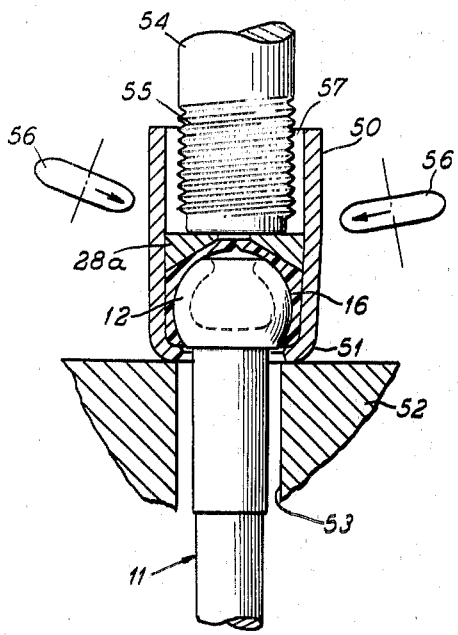
FIG. 5 is a view similar to FIG. 2 but illustrating a crimping operation according to this invention.

FIG. 5 illustrates somewhat diagrammatically the manner in which the crimping operation on the housing will provide part or all of the pre-loading force on the plastics bearing 16. In FIG. 5 a tubular housing blank 50 with an inturned end 51 has this end bottomed on a support 52 with an aperture 53 freely receiving the shank of the ball stud 11. The plastics bearing 16 enveloping the ball end 12 of the stud is seated in this tubular blank 50 against the inturned end 51 thereof. A stem free closure cap or plug 28a in the tubular blank 50 is pressed over the plastics bearing 16 by a plunger 54 which can be externally threaded at 55 to provide a mandrel on which the tube is to be shaped. Crimping jaws, swedging or crimping rollers or the like 56 surround the portion of the tube 50 above the plug 28a and are pressed against this portion to crimp the portion to a reduced diameter dimension fitting tightly around the threaded end 55a of the plunger. This crimping or swedging operation will develop some or all of the axial thrust load on the plug or cap 28a to create the pre-load on the plastics bearing 16 around the ball head 12. Alternately, some or all of the thrust load could be developed by the plunger 54.

The mandrel end 55 of the plunger 54 will have it threads embedded in the reduced diameter portion of the housing providing the threaded end similar to 33a for threading on a rod such as 40a.

The second embodiment of the invention thus has the metal tubular housing crimped for not only locking the closure plug in the housing to maintain the pre-load on the plastics bearing but to also provide a threaded skirt portion for direct attachment to the rod such as the rack bar of the steering gear.

From the above descriptions it will thus be clear that this invention provides inexpensive pre-loaded ball and socket joints for direct attachment to the ends of a rack bar of a rack and pinion steering gear having pre-loaded components where the pre-load is obtained as a result of a crimping operation creating axial forces on the bearing. Some or all of the pre-load can be introduced during crimping by the crimping action itself or the pre-load can be developed by a plunger.

I claim as my invention:

1. A joint comprising a stud having a head and a shank extending from the head, a plastics bearing enveloping said head, a metal tube surrounding said bearing, said tube having an inturned end bottoming the bearing and defining an aperture freely receiving the stud shank therethrough, a closure plug in said tube overlying the bearing, said tube and plug cooperating to provide a housing enveloping said bearing, a reduced diameter crimped portion on the tube holding the plug against the bearing and pre-loading the bearing on the stud head, and threaded means on the housing projecting beyond the closure plug to connect the joint to a rod member or the like.

2. The joint of claim 1, wherein the closure plug has a threaded stem projecting beyond the housing to provide the threaded means.

3. The joint of claim 1, wherein the housing has an internally threaded portion projecting beyond the closure plug to provide the threaded means.

4. The joint of claim 2, including a washer surrounding the stem in non-rotatable relation to provide a wrench head.

5. The joint of claim 3, including a washer surrounding the threaded portion of the housing to provide a wrench head.

6. The joint of claim 1 wherein the portion of the tube receiving the bearing is cylindrical.

7. The joint of claim 1, wherein the portion of the tube receiving the bearing is tapered toward the inturned end of the tube.

8. A joint for automotive vehicles including a rod having a threaded end portion, a stud having a head and a shank extending from the threaded end portion of the rod, a plastics bearing enveloping said stud head, a metal tube surrounding said bearing, said tube having an inturned end bottoming the bearing and defining an aperture freely receiving the stud shank therethrough, a closure plug in said tube overlying the bearing and cooperating with the tube to provide a housing enveloping the bearing, said tube having a reduced diameter crimped portion overlying the plug and pre-loading the bearing between the plug and inturned end of the tube, and threaded means on the housing extending beyond the plug in threaded engagement with the threaded end portion of said rod.

9. The joint of claim 8, wherein the rod has a threaded recess in the end thereof and the plug has a threaded stem threaded in said recess.

10. The joint of claim 8, wherein the rod has an externally threaded end and the tube has an internally threaded portion projecting beyond the plug in threaded engagement with said external threaded end of the rod.

11. The joint of claim 9, wherein the stem receives a washer in non-rotatable relation overlying the housing and providing a wrench head.

12. A joint comprising a stud having a head and a shank extending from the head, a plastics bearing enveloping the head, a metal tube surrounding said bearing, said tube having an inturned end bottoming the bearing and defining an aperture freely receiving the stud shank therethrough, a closure plug in said tube overlying the bearing, said tube and plug cooperating to provide a housing enveloping the bearing, a reduced diameter crimped portion on the tube having circumferentially spaced, external longitudinal folds, said reduced diameter crimped portion holding the plug against the bearing and preloading the bearing on the stud head, a rod member, and threaded means on the housing projecting beyond the closure plug connecting the joint to said rod member.

13. The joint of claim 12 wherein said longitudinal folds imparts resiliency to said reduced diameter crimped portion, the threaded means are internal threads in said reduced diameter crimped portion and the rod member has external threads threaded into said internal threads expanding the resilient crimped portion into tight gripping relationship therewith to prevent unauthorized relative rotation of the rod member and housing.

14. The joint of claim 12 including a washer on the reduced diameter crimped portion having grooves receiving the external folds to prevent rotation of the washer relative to the housing.

15. The joint of claim 14 wherein the washer has flat sides adapted to be engaged by a wrench.

* * * * *